United States Patent
Holtmanns et al.

(10) Patent No.: US 10,129,717 B2
(45) Date of Patent: Nov. 13, 2018

(54) DELIVERY OF WARNINGS OVER MOBILE TELECOMMUNICATION SYSTEMS

(75) Inventors: Silke Holtmanns, Klaukkala (FI); Rune Lindholm, Sottunga (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 394 days.

(21) Appl. No.: 14/413,816

(22) PCT Filed: Jul. 12, 2012

(86) PCT No.: PCT/FI2012/050728
§ 371 (c)(1),
(2), (4) Date: May 25, 2015

(87) PCT Pub. No.: WO2014/009593
PCT Pub. Date: Jan. 16, 2014

(65) Prior Publication Data
US 2015/0264546 A1 Sep. 17, 2015

(51) Int. Cl.
*H04W 4/20* (2018.01)
*H04W 4/22* (2009.01)
(Continued)

(52) U.S. Cl.
CPC ............ *H04W 4/22* (2013.01); *G06F 17/248* (2013.01); *G06Q 10/0637* (2013.01);
(Continued)

(58) Field of Classification Search
CPC ........ H04W 4/22; G06F 17/28; G06F 17/289; G06F 17/248; G06F 17/2836
See application file for complete search history.

(56) References Cited

U.S. PATENT DOCUMENTS

| 5,898,904 A | 4/1999 | Wang |
| 6,308,087 B1 | 10/2001 | Aoshima |

(Continued)

FOREIGN PATENT DOCUMENTS

| CN | 1234698 A | 11/1999 |
| EP | 1148695 | 10/2001 |

(Continued)

OTHER PUBLICATIONS

International Search Report and Written Opinion received for corresponding Patent Cooperation Treaty Application No. PCT/FI2012/050728, dated Apr. 18, 2013, 15 pages.

(Continued)

*Primary Examiner* — Curtis Odom
(74) *Attorney, Agent, or Firm* — Alston & Bird LLP

(57) ABSTRACT

A warning system in which users' devices performs a method including: receiving a broadcast message comprising message information in a first human language from a mobile telecommunication network or an indication of an alternative radio bearer or network for retrieval of the message information; storing information templates in one or more different human languages; and presenting to a user, according to a language preference of the user: the message information of the broadcast message; or one or more information templates corresponding to the message information, in a second human language other than the first human language.

20 Claims, 3 Drawing Sheets

(51) Int. Cl.
*H04W 4/18* (2009.01)
*G06Q 10/06* (2012.01)
*G06Q 10/10* (2012.01)
*G06Q 50/10* (2012.01)
*G06F 17/24* (2006.01)
*H04M 11/04* (2006.01)
*H04W 76/50* (2018.01)
*H04W 4/90* (2018.01)
*H04L 29/08* (2006.01)
*H04W 4/06* (2009.01)
*H04W 4/12* (2009.01)
*H04L 12/18* (2006.01)

(52) U.S. Cl.
CPC .............. *G06Q 10/10* (2013.01); *G06Q 50/10* (2013.01); *H04L 12/1895* (2013.01); *H04M 11/04* (2013.01); *H04W 4/18* (2013.01); *H04W 4/90* (2018.02); *H04W 76/50* (2018.02); *H04L 12/189* (2013.01); *H04L 67/306* (2013.01); *H04W 4/06* (2013.01); *H04W 4/12* (2013.01)

(56) References Cited

U.S. PATENT DOCUMENTS

| | | | |
|---|---|---|---|
| 7,974,645 B2 | 7/2011 | Choi-Grogan | |
| 2002/0177428 A1 | 11/2002 | Menard et al. | |
| 2004/0192258 A1 | 9/2004 | Atkin et al. | |
| 2007/0280138 A1 | 12/2007 | Stern | |
| 2008/0037723 A1 | 2/2008 | Milstein et al. | |
| 2008/0046231 A1 | 2/2008 | Laden et al. | |
| 2009/0130972 A1* | 5/2009 | Andersen | H04W 8/245 455/3.01 |
| 2009/0247113 A1 | 10/2009 | Sennett et al. | |
| 2010/0003945 A1 | 1/2010 | Primo et al. | |
| 2010/0009651 A1 | 1/2010 | Daly et al. | |
| 2011/0270940 A1 | 11/2011 | Johnson et al. | |
| 2012/0036529 A1 | 2/2012 | Mcclenny et al. | |
| 2012/0082091 A1 | 4/2012 | Siomina et al. | |
| 2012/0215521 A1* | 8/2012 | Sistrunk | G06F 17/289 704/3 |
| 2013/0132066 A1* | 5/2013 | Eldawy | G06F 17/2836 704/3 |
| 2013/0300536 A1* | 11/2013 | Bell | G08B 27/001 340/7.45 |

FOREIGN PATENT DOCUMENTS

| | | |
|---|---|---|
| EP | 1343096 | 9/2003 |
| EP | 1727024 | 11/2006 |
| EP | 2388711 A2 | 11/2011 |
| WO | 2009029296 | 3/2009 |
| WO | 2012/066384 A1 | 5/2012 |

OTHER PUBLICATIONS

"ATIS Standard on CMAS (Public warning system for USA)—Spanish language support", Cmasalert, Retrieved on Feb. 17, 2016, Webpage available at : http://www.cmasalert.com/cmas.html.

"Earthquake Early Warning (Japan)", Wikipedia, Retrieved on Feb. 15, 2016, Webpage available at : https://en.wikipedia.org/wiki/Earthquake_Early_Warning_(Japan).

"EU Alert/GDACS", Cmasalert, Retrieved on Feb. 17, 2016, Webpage available at : http://www.cmasalert.com/amas.html.

"ICT for Disaster Management/ICT for Disaster Prevention, Mitigation and Preparedness", Wikibooks, Retrieved on Feb. 1, 2016, Webpage available at : https://en.wikibooks.org/wiki/ICT_for_Disaster_Management/ICT_for_Disaster_Prevention,_Mitigation_and_Preparedness.

"Disaster Warning to Indian Fishermen through IRNSS", ICG-2, 2007, 13 pages.

"Effective DisasterWarnings", Report by the Working Group on Natural Disaster Information Systems, Subcommittee on Natural Disaster Reduction, Nov. 2000, pp. 1-56.

"Strategic Plan for the Integrated Public Alert and Warning System (IPAWS) Program", Fema, Jun. 2010, 16 pages.

"3rd Generation Partnership Project; Technical Specification Group Services and System Aspects; Public Warning System (PWS) requirements (Release 11)", 3GPP TS 22/68, V11.4.0, Mar. 2012, pp. 1-15.

Extended European Search Report received for corresponding European Patent Application No. 12880873.0, dated Dec. 18, 2015, 6 pages.

Office Action from corresponding Chines Patent Application No. 201280075759.5 dated Jul. 3, 2017, 37 pages.

Office Action from corresponding Chinese Patent Application No. 201280075759.5 dated Feb. 11, 2018 with English Translation, 8 pages.

* cited by examiner

DELIVERY OF WARNINGS OVER MOBILE TELECOMMUNICATION SYSTEMS

RELATED APPLICATION

This application was originally filed as PCT Application No. PCT/FI2012/050728 filed Jul. 12, 2012.

TECHNICAL FIELD

The present application generally relates to delivery of warnings over mobile telecommunication systems.

BACKGROUND

Disasters of various kinds have necessitated creating of warning systems that deliver initial warnings directly to mobile telephones. Such warnings are desired to better reach people than earlier used radio broadcasts over traditional FM or AM radios and warning signals delivered by loudspeakers. There are also many locations that lack such loudspeakers that could be heard.

For a warning system to work properly, people must be reached and the message be conveyed as soon as possible. Mobile telephones operate in radio networks where the network resource is a scarce resource that does not suffice for simultaneous use of everyone in a point to point manner. Moreover, when a warning of a large disaster is announced, it is typical that people start to place phone calls and send short messages which in turn adds congestion in the radio networks.

SUMMARY

Various aspects of examples of the invention are set out in the claims.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
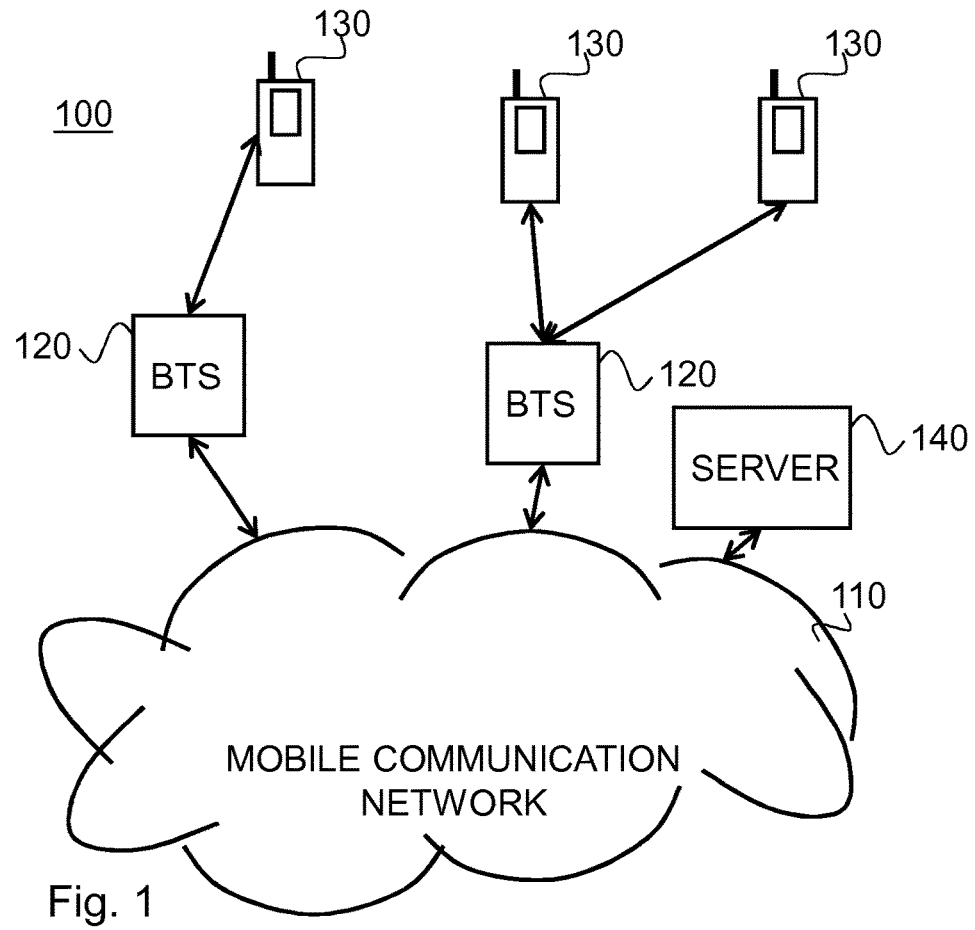
FIG. 1 shows an architectural overview of a system of an example embodiment of the invention.

FIG. 1 shows an architectural overview of a system 100 of an example embodiment of the invention. The system 100 comprises a mobile telecommunication network 110 that has a plurality of base stations 120 and mobile telecommunication devices 130 that can receive messages from the telecommunication network 110. Some of the mobile telecommunication devices 130 are subscribing devices to the mobile telecommunication network 110 while some others are roaming in the mobile telecommunication network 110.

A server 140 is shown for producing information messages for the mobile telecommunication devices 130.

Each of the mobile telecommunication devices 130 is in communicative connection with zero to many base stations 120. Some of the telecommunication devices 130 can be roaming in other networks, some of the telecommunication devices 130 can be switched of or in radio shadows an out of network coverage, but typically a very large proportion of the telecommunication devices 130 are accessible by at least one of the base stations 120. If an emergency arises, the authorities of a country or region may desire to cause sending, by the server 140, messages such as warnings or advise to people in the telecommunication network. Notice that some embodiments of the invention employ more than one telecommunication networks i.e. the scope of the invention is not restricted to within a single network whilst the description does so in sake of simplicity.

Figure 2:
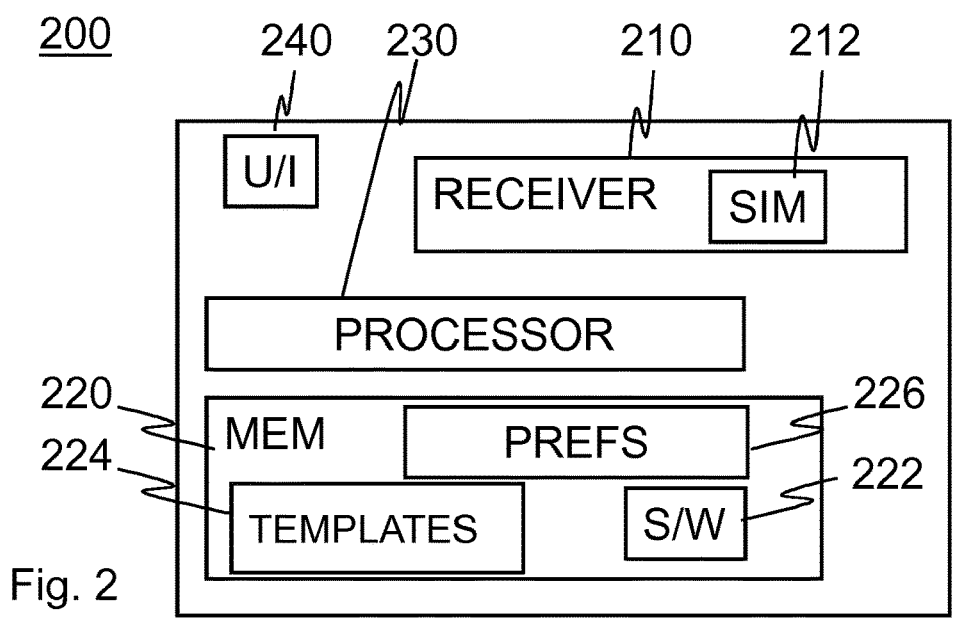
FIG. 2 shows a block diagram of an apparatus suited for use in some example embodiments of the invention.

FIG. 2 shows a block diagram of an apparatus 200 suited for use in some example embodiments of the invention. The structure of the apparatus 200 is next described also with reference to FIG. 3 that shows a flow chart that illustrates some example embodiments of the invention. The apparatus 200 comprises a mobile telecommunication receiver 210 configured to receive (300 in FIG. 3) a broadcast message comprising message information in a first human language from a mobile telecommunication network. The receiver 210 is, for example, a LTE, WLAN, GSM, UMTS, CDMA-2000, PDC, IS-95 receiver or a satellite phone receiver.

The message information comprises, for example, any of text, image or video information.

In an example embodiment, the apparatus 200 receives an indication of an alternative radio bearer or network for retrieval of the message information. In this embodiment, the apparatus 200 comprises a message retriever configured to receive the message information in response to the mobile telecommunication receiver receiving the indication. The message retriever can be implemented e.g. using a dual- or multi-mode receiver (the mobile telecommunication receiver 210 can be such) or by using a dedicated receiver (not shown in FIG. 2) that can be any wireless or wired receiver such as a text television, FM-radio receiver, RDS text receiver, and/or wired Internet receiver, for example.

The receiver 210 can be a built-in unit such as a receiver circuitry in a mobile telephone or an add-on such as a USB attachment for a personal computer. In an example embodiment, the receiver 212 is configured to receive a subscriber identity module 212 (that can be a RUIM or USIM in some other example embodiments).

The apparatus 200 can also have further capabilities. In fact, the apparatus 200 can be basically any electronic device, such as a laptop computer with an integrated or additional mobile communication circuitry, a personal digital assistant, a satellite navigator, a portable game console, a digital camera, a tablet computer, a fixed device e.g. for a summer cottage or a satellite phone.

The apparatus 200 further comprises a memory 220 configured to store (305 in FIG. 3) information templates 224 in one or more different human languages. In some example embodiments, the information templates 224 is stored in the memory 220 on manufacturing the apparatus 200, downloaded by the apparatus 200 and/or provisioned over a wireless or wired connection.

The information templates 224 comprise text in one example embodiment. In other example embodiments, the information templates 224 comprise alternatively or additionally image, picture, pictogram, audio and/or video information. The audio information can be in form of an audio message. In one example embodiment, some information templates contain different types of media information elements. Also one information element can comprise more than one types of information. For instance, the Red Cross sign can be replaced by the sign of the Red Crescent dependent on language as a likely indicator of cultural or religious background of recipients of the information messages.

While various media types are possible, it can be presumed for simplification purpose that the message information and the information templates contain only text. In this context, term text may refer to any textual information not necessarily limited to alphabetic or alphanumeric strings, while these are also covered, but further to any strings of alphanumeric characters, punctuation marks and various other visible characters such as currency symbols.

The memory 220 also contains in an example embodiment software 222 for controlling the apparatus 200 to implement various example embodiments of the invention. The memory 220 can be a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory 220 can also be formed into a device without other substantial functions than storing information or it may be formed as part of a device with other functions, including but not limited to a memory 220 of a computer, a chip set, and a sub assembly of an electronic device.

Figure 3:
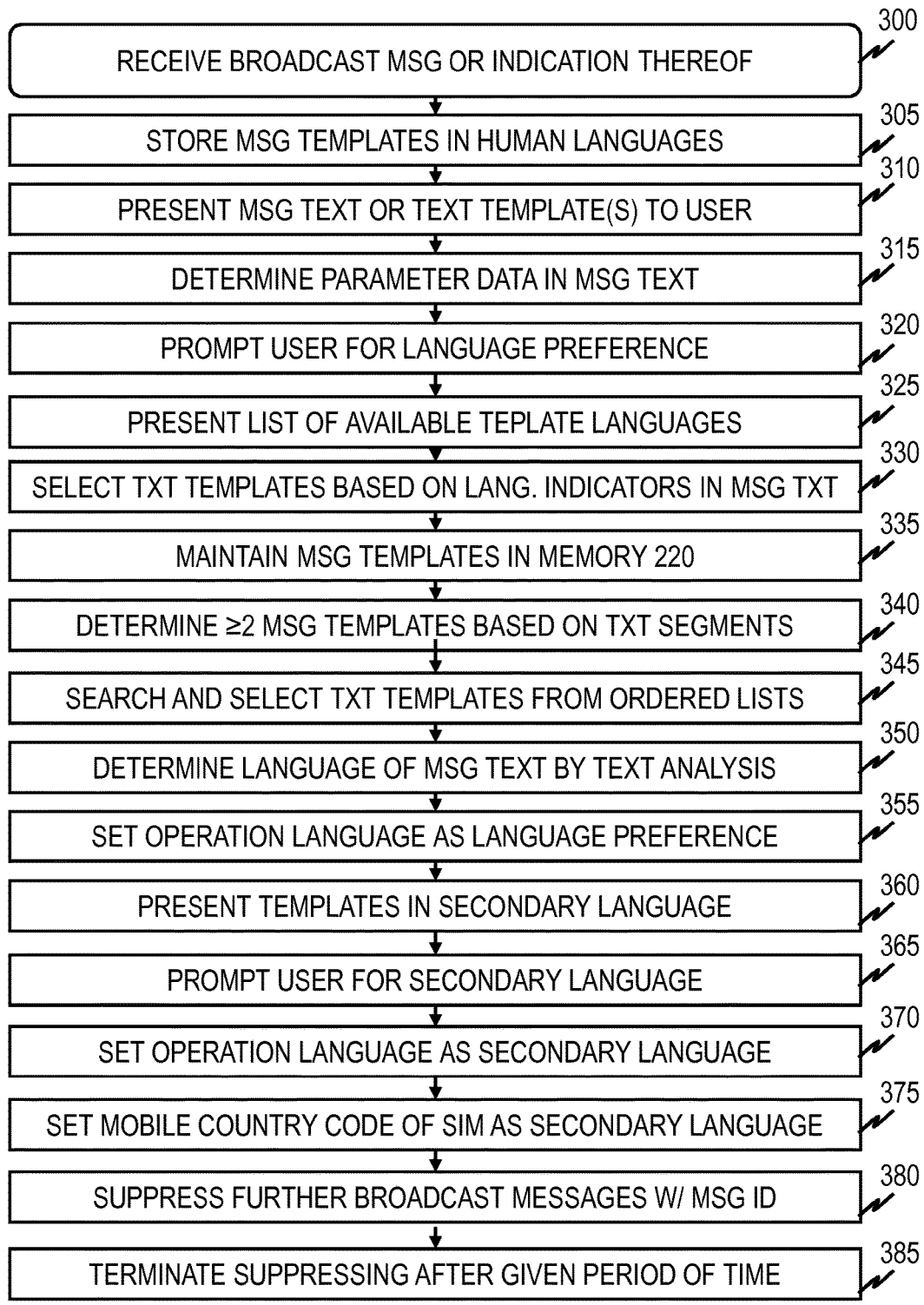
FIG. 3 is a flow chart that illustrates some example embodiments of the invention.

Further the apparatus 200 has a processor 230 configured to cause presenting to a user, according to a language preference of the user: the message information of the broadcast message; or one or more information templates corresponding to the message information, in a second human language other than the first human language as in step 310 in FIG. 3. The language preference and optionally further preferences and settings are also stored in an example embodiment in the memory 220 as preferences 226. In some cases, the presentation of the message information or information templates is subjected to a message authorization for preventing delivery of false warning messages, for example. The message information conveys, in some example embodiments, warning messages. These warning messages can provide instructions for avoiding risks associated with a disaster. Alternatively, the message information may convey other instructions to the user, for example for voting arrangements in a national or local election, safe exit after a mass event such as a rock concert, tornado warnings, earth quake warnings, volcano explosion warnings, tsunami warnings. Among the other preferences there is, in one example embodiment, a selection whether the message information should be presented to the user in cases where message authorization protection cannot be verified.

In this context, the presenting is done in various example embodiments, for example, in any one or more of displaying information; speech synthesizing information; and producing information using Braille communication.

The processor 230 is in some example embodiments a master control unit (MCU). Alternatively, the processor may be a microprocessor, a digital signal processor (DSP), an application specific integrated circuit (ASIC), a field programmable gate array, a microcontroller or a combination of such elements.

The apparatus 200 further comprises a user interface 240 that comprises, for example, one or more of the following: a display, speaker, microphone, keys, keypad, keyboard and touch screen.

In an example embodiment, the processor 230 is further configured to determine parameter data in the message information, step 315. This can be done e.g. so that the parameters are marked by predetermined tag characters (e.g. by two subsequent slash marks or any other predetermined string of characters leading, following or leading and following the parameter data). In another example, parameter data is presented by using such characters that are not otherwise used in the messages. The processor 230 is further configured to cause the presenting of the one or more information templates corresponding to the message information such that the parameter data is located corresponding to the message information and grammar of the second human language. For instance, some languages are written left to right while some others are written right to left. If the information is presented by displaying, the processor 230 takes into account, in this example embodiment, the direction of writing by placing the first information templates and continuing to following information templates and parameter data in writing direction as defined by the grammar of the language in question.

In an example embodiment, the processor 230 is further configured to cause prompting the user for the language preference, step 320. This can take place on reception of the broadcast message or before the reception of the broadcast message.

In an example embodiment, the processor 230 is configured to determine the language preference by analyzing text input by the user e.g. by analyzing messages sent and/or received by the user and deriving the language e.g. from used vocabulary and/or grammar rules.

In an example embodiment, the processor 230 is further configured to cause, on the causing of the prompting the user for the preferred language, presenting to the user a list of available human languages in which information templates corresponding to the message information are stored in the memory 220, step 325. For example, the processor 230 can check for each segment or information template for availability in the language of the language preference. In some human languages, there may be fewer information templates and it may thus be impossible to present all the segments of the message information in these languages and thus they may be excluded from selecting by the user on the prompting.

In an example embodiment, the memory 220 is configured to store language indications associated with the information templates. For instance, a language indicator or index can be stored in association with each information template. The processor 230 can then select the one or more information templates based on the stored language indications and based on the language preference. See step 330.

In an example embodiment, the information templates are stored 335 in the memory 220 as one group per language so that the language indication is specific for each group of information templates. This embodiment may produce a technical effect that the information templates are better suited for translation as located in one group. Moreover, the language indicators may be unnecessary if the language is commonly defined for a group of information templates.

In an example embodiment, the message information contains two or more different text segments and individual indicators for each text segment and the processor 230 is further configured to determine corresponding two or more information templates based on the respective indicators, step 340.

In an example embodiment, the information templates are stored in ordered lists with matching meaning and the processor 230 is further configured to search for information templates that constitute the message information and to select respective information templates in the second human language, step 345.

In an example embodiment, the apparatus the processor 230 is further configured to determine the first human language by analyzing the received message information, step 350. This analyzing can be performed, for example, by comparing words in the message information with common words in stored dictionaries representative of the languages of the information templates. Another example embodiment makes further or alternatively use of detecting special characters or a used character set characteristic to a given language.

In an example embodiment, the processor 230 is further configured to set as the language preference a language in which the apparatus is set up to operate, step 355. Often, mobile phones and other apparatuses have more than one operating languages and the user selects one in a setup for use. This selection can then be also used for the purpose of determining a target language in which the message information should be presented to the user.

In an example embodiment, the processor 230 is further configured to determine if the first human language differs from the preferred language and if no information templates are found in the preferred language, to cause presenting one or more information templates corresponding to the message information in a secondary human language, step 360. It is understood that if the message information is readily in the language preferred by the user, then no particular action is needed but the message information can be presented as such. If the message information is understood to contain characters that indicate the type of the message, parameter data fields and/or indicators of text segments, these characters can yet be further suppressed according to one example embodiment.

An example of the use of parameter data is next explained. Let us assume that the information message comprises following text:

A tsunami with estimated wave height\ 3\ m may hit at\ 12:34 \o'clock near \Exampletown.

In this example, parameter data is separated from message information by dedicated characters, backslash in this example so that even a non-compliant device could present the message information understandably to the user. The receiving apparatus 200 can then, according to an example embodiment, identify each parameter field and its relation to surrounding text for using with information templates of other languages.

As mentioned in the foregoing, the apparatus 200 or its processor 230 can be configured to identify each text segment or information template based on correspondence with the message information. In this example, there were no indicators for different information templates. In an alternative example embodiment, the message information comprises, e.g. in the end, one or more template indicators for indicating the information template(s) that are to be used for presenting the message information in another language.

In one another example embodiment, the message information comprises text, image, picture, audio and/or video information followed by (located elsewhere) information template code(s) and parameter data so that there are not necessarily any special characters as start and end signs of the parameter data. In some example embodiments, font settings, where available, are used to indicate parameter data and/or information template code(s).

In an example embodiment, the processor 230 is configured to prompt the user for the secondary human language, step 365.

In an example embodiment, the processor 230 is further configured to set as the secondary language a language in which the apparatus is set up to operate, step 370.

In an example embodiment, the processor 230 is further configured to set the secondary language based on a mobile country code associated with a subscriber identity module in of the mobile telecommunication device, step 375.

In an example embodiment, the processor 230 is further configured to determine a message identifier from the received broadcast message and to suppress presenting of other broadcast messages with matching message identifier, step 380.

In an example embodiment, the processor 230 is further configured to terminate the suppressing after a given period of time, step 385.

FIG. 3 shows various process steps that are optional or not suited for use with some other steps. It should be appreciated that FIG. 3 solely presents some exemplary steps that can be used in some example embodiments and also the arrows of FIG. 3 merely present one possible general order of events.

The structure of the server 140 can be that known from the modern server computers that are used for producing services in mobile communication networks. Hence, the structure is not further discussed. Instead, let us briefly consider the operation of the server 140.

Figure 4:
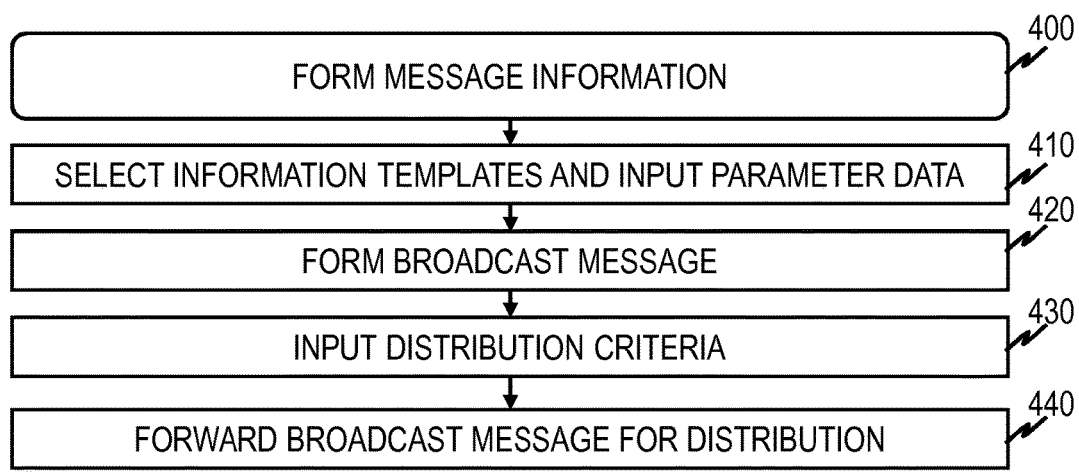
FIG. 4 shows a flow chart illustrating some basic operations of the server according to some example embodiments of the invention.

FIG. 4 shows a flow chart illustrating some basic operations of the server 140 according to some example embodiments of the invention.

In step 400, message information is formed e.g. using a warning application. An operator can select from the commonly distributed information templates one or more that are most applicable and enter parameter data, step 410. A broadcast message can then be formed by the server 140, step 420. The server 140 may also input 430 one or more distribution criteria e.g. concerning the area or networks where the broadcast message should be distributed. Then server 140 forwards 440 the broadcast message for distribution to applicable one or more communication networks.

In an example embodiment, there is provided a server comprising an input configured to receive from an operator identification of one or more information templates and corresponding parameter data, to form a broadcast message and to cause delivery of the broadcast message. The server may further be configured to receive from the operator an indication of an area or range of recipients for selecting the recipients of the broadcast message and to accordingly cause the delivery of the broadcast message.

It is appreciated that the example embodiments described in the foregoing provide various technical effects and advantages. For instance, when a warning system is implemented to inform masses of people, the circumstances may place extreme requirements. Every second may be important e.g. for distributing Tsunami or tornado warnings. In such extreme situations, the network may also break down e.g. when an antenna or the power supply of a base station or some core network element is destroyed by a tornado, volcanic disruption or earth quake. The inventors have realized the importance of distributing information to people as fast and efficient as possible. The example embodiments may be particularly efficient in countries with more than one native tongues. People from one language group do not necessarily understand the language from the other language groups. By sending the message information in one language and presenting people native tongues other than the language of the message information by using information templates, the message transmission can be effected at once for tens of different languages.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a the apparatus 200 described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined. Moreover, it is to be understood that the structural and functional elements can be implemented in any of many different ways. For instance, two or more of the separately drawn elements in FIG. 2 can be integrated into a common element, and/or elements drawn or explained anywhere in this document can be formed of two or more discrete elements. The elements also can have other functions than those described: a complete description of different elements of e.g. mobile phones would be unnecessary. Instead, it shall be understood that e.g. the processor 230 can well also run various tasks relating to operating system, applications and services that are used by the apparatus 200.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a mobile telecommunication receiver configured to receive a broadcast message comprising message information in a first human language from a mobile telecommunication network or an indication of an alternative radio bearer or network for retrieval of the message information, wherein the broadcast message is a public warning message supported by the Public Warning System (PWS), and the message information comprises an operator identification of corresponding parameter data, wherein the parameter data is separated from the message information by one or more dedicated characters;
   a memory configured to store information templates in one or more different human languages; and
   a processor configured to cause presenting to a user, according to a language preference of the user:
      the message information of the broadcast message; or
      one or more information templates corresponding to the message information, in a second human language other than the first human language.

2. The apparatus of claim 1, further comprising a message retriever configured to retrieve the message information from the alternative radio bearer or network when the broadcast message comprises the indication.

3. The apparatus of claim 2, further comprising a message retriever configured to receive the message information in response to the mobile telecommunication receiver receiving the indication.

4. The apparatus of claim 1, wherein the processor is further configured to determine parameter data in the message information and to cause the presenting of the one or more information templates corresponding to the message information such that the parameter data is located corresponding to the message information and grammar of the second human language.

5. The apparatus of claim 1, wherein the processor is further configured to cause prompting the user for the language preference.

6. The apparatus of claim 5, wherein the processor is configured to cause the prompting on reception of the broadcast message.

7. The apparatus of claim 6, wherein the processor is configured to cause, on the causing of the prompting the user for the preferred language, presenting to the user a list of available human languages in which information templates corresponding to the message information are stored in the memory.

8. The apparatus of claim 1, wherein the memory is configured to store language indications associated with the information templates and the processor is configured to select the one or more information templates based on the stored language indications and based on the language preference.

9. The apparatus of claim 8, wherein the memory is further configured to store the information templates in the memory as one group per language so that the language indication is specific for each group of information templates.

10. The apparatus of claim 1, wherein the message information contains two or more different text segments and indicators for each text segment; and
    wherein processor is further configured to determine corresponding two or more information templates based on the respective indicators.

11. The apparatus of claim 1, wherein the information templates are stored in ordered lists with matching meaning and the processor is further configured to search for information templates that constitute the message information and to select respective information templates in the second human language.

12. The apparatus of claim 1, wherein the processor is further configured to determine the first human language by analyzing the received message information.

13. The apparatus of claim 1, wherein the processor is further configured to set as the language preference a language in which the apparatus is set up to operate.

14. A non-transitory computer-readable medium encoded with instructions that, when executed by a computer, at least perform:
    receiving a broadcast message comprising message information in a first human language from a mobile telecommunication network or an indication of an alternative radio bearer or network for retrieval of the message information, wherein the broadcast message is a public warning message supported by the Public Warning System (PWS), and the message information comprises an operator identification of corresponding parameter data, wherein the parameter data is separated from the message information by one or more dedicated characters;

storing of information templates in one or more different human languages; and presenting to a user, according to a language preference of the user:

the message information of the broadcast message; or one or more information templates corresponding to the message information, in a second human language other than the first human language.

15. A method, comprising:

receiving a broadcast message comprising message information in a first human language from a mobile telecommunication network or an indication of an alternative radio bearer or network for retrieval of the message information, wherein the broadcast message is a public warning message supported by the Public Warning System (PWS), and the message information comprises an operator identification of corresponding parameter data, wherein the parameter data is separated from the message information by one or more dedicated characters;

storing information templates in one or more different human languages; and presenting to a user, according to a language preference of the user:

the message information of the broadcast message; or one or more information templates corresponding to the message information, in a second human language other than the first human language.

16. The method of claim 15, further comprising determining parameter data in the message information and performing the presenting of the one or more information templates corresponding to the message information such that the parameter data is located corresponding to the message information and grammar of the second human language.

17. The method of claim 15, further comprising prompting the user for the language preference.

18. The method of claim 17, wherein the prompting is performed on reception of the broadcast message.

19. The method of claim 18, further comprising, on the causing of the prompting the user for the preferred language, presenting to the user a list of available human languages in which information templates corresponding to the message information are stored in the memory.

20. The method of claim 15, further comprising determining the language preference by analyzing text input by the user.

* * * * *